US007640529B2

(12) United States Patent
Croke et al.

(10) Patent No.: US 7,640,529 B2
(45) Date of Patent: Dec. 29, 2009

(54) USER-FRIENDLY RULE-BASED SYSTEM AND METHOD FOR AUTOMATICALLY GENERATING PHOTOMASK ORDERS

(75) Inventors: Charles E. Croke, Oakville, CT (US); Daniel J. Cahalane, New Milford, CT (US); Anthony Baxter, Cheshire, CT (US); Nicholas P. Ridgway, Heavily (GB)

(73) Assignee: Photronics, Inc., Brookfield, CT (US)

( * ) Notice: Subject to any disclaimer, the term of this patent is extended or adjusted under 35 U.S.C. 154(b) by 0 days.

(21) Appl. No.: 10/981,201

(22) Filed: Nov. 3, 2004

(65) Prior Publication Data
US 2005/0144088 A1 Jun. 30, 2005

Related U.S. Application Data

(63) Continuation-in-part of application No. 10/877,001, filed on Jun. 25, 2004, which is a continuation-in-part of application No. 10/209,254, filed on Jul. 30, 2002, now Pat. No. 6,842,881.

(51) Int. Cl.
*G06F 17/50* (2006.01)

(52) U.S. Cl. .............................. 716/19; 716/20; 716/21; 700/121

(58) Field of Classification Search ............. 716/19–21; 700/121
See application file for complete search history.

(56) References Cited
U.S. PATENT DOCUMENTS 3,698,072 A 10/1972 Koens et al.
3,753,233 A * 8/1973 Cardell et al. ............... 715/531
3,900,737 A 8/1975 Collier et al.
4,149,246 A 4/1979 Goldman
4,875,162 A 10/1989 Ferriter et al.

(Continued)

FOREIGN PATENT DOCUMENTS

WO WO-02/03141 A2 1/2002

OTHER PUBLICATIONS

Edward Suttile, Charles Croke, and James Morrison, *Behind The Mask: Streamlining The Front-End Reticle Fabrication Process By Improving Mask Ordering*, MICRO Magazine, Jun. 2002, p. 1-5.

(Continued)

*Primary Examiner*—Naum B Levin
(74) *Attorney, Agent, or Firm*—Amster, Rothstein & Ebenstein LLP

(57) ABSTRACT

A system for generating photomask orders in a specified format includes at least one template or order for entry and storage of photomask order data, wherein the at least one template or order is created based upon requirements of a specified photomask order format. The system includes at least one set of rules corresponding to the at least one template or order, wherein the set of rules includes instructions which insure that a user enter complete information into the at least one template or order as required by the specified order format. The templates or order may be further comprised of components and/or subcomponents which can be stored separately. The data fields in the orders, templates, components, subcomponents, etc. may reference specification grades which can in turn be easily modified to update one or more orders, templates, components, subcomponents, etc. simultaneously.

24 Claims, 5 Drawing Sheets

U.S. PATENT DOCUMENTS

| | | | |
|---|---|---|---|
| 5,117,354 A | | 5/1992 | Long et al. |
| 5,260,866 A | | 11/1993 | Lisinki et al. |
| 5,528,503 A | * | 6/1996 | Moore et al. ............... 700/95 |
| 5,563,702 A | | 10/1996 | Emery et al. |
| 5,570,291 A | | 10/1996 | Dudle et al. |
| 5,570,292 A | | 10/1996 | Abraham et al. |
| 5,694,551 A | | 12/1997 | Doyle et al. |
| 5,870,771 A | | 2/1999 | Oberg |
| 5,892,900 A | * | 4/1999 | Ginter et al. ............... 726/26 |
| 5,909,570 A | | 6/1999 | Webber |
| 5,933,350 A | | 8/1999 | Fujimoto et al. |
| 5,950,201 A | | 9/1999 | Van Huben et al. |
| 5,969,972 A | * | 10/1999 | Kerszykowski et al. ..... 700/121 |
| 6,012,070 A | | 1/2000 | Cheng et al. |
| 6,212,441 B1 | | 4/2001 | Hazama et al. |
| 6,263,255 B1 | * | 7/2001 | Tan et al. ............... 700/121 |
| 6,324,521 B1 | | 11/2001 | Shiota et al. |
| 6,330,708 B1 | * | 12/2001 | Parker et al. ............... 716/19 |
| 6,336,056 B1 | | 1/2002 | Fujimoto et al. |
| 6,363,358 B1 | | 3/2002 | Palmer et al. |
| 6,366,822 B1 | * | 4/2002 | Heavlin ............... 700/31 |
| 6,453,335 B1 | * | 9/2002 | Kaufmann ............... 709/203 |
| 6,526,545 B1 | | 2/2003 | Lin et al. |
| 6,578,188 B1 | * | 6/2003 | Pang et al. ............... 716/19 |
| 6,615,098 B1 | * | 9/2003 | Bode et al. ............... 700/121 |
| 6,615,166 B1 | | 9/2003 | Guheen et al. |
| 6,622,295 B1 | | 9/2003 | Schepp et al. |
| 6,662,340 B2 | * | 12/2003 | Rawat et al. ............... 715/507 |
| 6,664,010 B2 | * | 12/2003 | Ahrens et al. ............... 430/5 |
| 6,691,301 B2 | * | 2/2004 | Bowen ............... 717/114 |
| 6,725,122 B2 | | 4/2004 | Mori et al. |
| 6,782,516 B2 | | 8/2004 | Rittman et al. |
| 6,782,517 B2 | | 8/2004 | Rittman et al. |
| 6,782,524 B2 | | 8/2004 | Rittman et al. |
| 6,801,823 B2 | | 10/2004 | Mori |
| 6,989,603 B2 | * | 1/2006 | Zhang ............... 257/774 |
| 7,007,034 B1 | * | 2/2006 | Hartman et al. ............. 707/102 |
| 7,058,582 B2 | * | 6/2006 | Powell ............... 705/1 |
| 7,287,227 B2 | * | 10/2007 | Ries et al. ............... 715/741 |
| 7,356,374 B2 | * | 4/2008 | Suttile et al. ............... 700/97 |
| 7,480,539 B2 | * | 1/2009 | Suttile et al. ............... 700/121 |
| 2002/0013731 A1 | | 1/2002 | Bright et al. |
| 2002/0013742 A1 | | 1/2002 | Shiota et al. |
| 2002/0055878 A1 | | 5/2002 | Burton et al. |
| 2002/0059122 A1 | | 5/2002 | Inoue et al. |
| 2002/0062475 A1 | | 5/2002 | Iborra et al. |
| 2002/0072956 A1 | * | 6/2002 | Willems et al. ............. 705/10 |
| 2002/0091991 A1 | | 7/2002 | Castro |
| 2002/0100014 A1 | * | 7/2002 | Iborra et al. ............... 717/104 |
| 2002/0111164 A1 | * | 8/2002 | Ritter ............... 455/426 |
| 2002/0143650 A1 | | 10/2002 | Matsuda |
| 2002/0184266 A1 | | 12/2002 | Blessin |
| 2003/0061587 A1 | | 3/2003 | Zhang et al. |
| 2003/0225474 A1 | * | 12/2003 | Mata et al. ............... 700/121 |
| 2004/0054633 A1 | | 3/2004 | Huyghe et al. |

OTHER PUBLICATIONS

Photronics, Screenshots from Align Rite system (9 sheets) see attached "Description of AlignRite Screenshots".

Photoronics, Inc., P10 Photomask Orders Task Force Minutes, Apr. 15, 2003, pp. 1-6.

Photoronics, Inc., P10 Photomask Orders Task Force Minutes, Jul. 8, 2003, pp. 1-6.

Photoronics, Inc., P10 Photomask Orders Task Force Minutes, Apr. 25, 2006, pp. 1-11.

Semiconductor Equipment and Materials International (SEMI), SEMI P10 Workshop, Presented by West Erck, P10 Task Force Leader, Jim McCracken, Centerlink and Harrold Patterson, Photronics, Jul. 14, 2003 SEMI CON East Presentation, pp. 1-58.

* cited by examiner

USER-FRIENDLY RULE-BASED SYSTEM AND METHOD FOR AUTOMATICALLY GENERATING PHOTOMASK ORDERS

RELATED APPLICATIONS

This application is a continuation-in-part of U.S. patent application Ser. No. 10/877,001, filed on Jun. 25, 2004, which is in turn a continuation-in-part of U.S. patent application Ser. No. 10/209,254, filed on Jul. 30, 2002, now U.S. Pat. No. 6,842,881, issued Jan. 11, 2005. The subject matter of this application is related to those of U.S. patent application Ser. No. 10/099,622, filed on Mar. 14, 2002, now U.S. Pat. No. 6,760,640, issued Jul. 6, 2004, and U.S. patent application Ser. No. 10/852,532, filed on May 24, 2004, now U.S. Pat. No. 6,996,450, issued Feb. 7, 2006, both of which share the same assignee with this application. The disclosure of all of the foregoing applications is hereby incorporated by reference in its entirety as if set forth herein.

FIELD OF THE INVENTION

The present invention generally relates to a user-friendly rule-based system and method for automatically generating photomask orders in a specified format. More particularly, the present invention relates to a software-based application which automatically generates photomask orders in a specified format through the use of templates and rules which guide a user through the process of generating a photomask order in a complete and accurate manner. The rules and templates are established based on the requirements of a particular standard (e.g., SEMI P10), or proprietary photomask order format, and are organized and stored in a manner which can be adapted to meet the criteria of both modified and new photomask order formats now known or hereinafter developed. Additionally, the system and method of the present invention provide for the ability to generate new photomask orders using existing photomask order data, which are easily editable by a user.

BACKGROUND OF THE INVENTION

Photomasks are high precision plates containing microscopic images of electronic circuits. Photomasks are typically made from very flat pieces of quartz or glass with a layer of chrome on one side. Etched in the chrome is a portion of an electronic circuit design. This circuit design on the mask is also called "geometry."

A typical photomask used in the production of semiconductor devices is formed from a "blank" or "undeveloped" photomask. As shown in FIG. 1, a typical blank photomask 10 is comprised of three or four layers. The first layer 11 is a layer of quartz or other substantially transparent material, commonly referred to as the substrate. The next layer is typically a layer of opaque material 12, such as Cr, which often includes a third layer of antireflective material 13, such as CrO. The antireflective layer may or may not be included in any given photomask. The top layer is typically a layer of photosensitive resist material 14. Other types of photomasks are also known and used including, but not limited to, phase shift masks, embedded attenuated phase shift masks ("EAPSM") and alternating aperture phase shift masks ("AAPSM").

The process of manufacturing a photomask involves many steps and can be time consuming. In this regard, to manufacturer a photomask, the desired pattern of opaque material 12 to be created on the photomask 10 is typically defined by an electronic data file loaded into an exposure system which typically scans an electron beam (E-beam) or laser beam in a raster or vector fashion across the blank photomask. One such example of a raster scan exposure system is described in U.S. Pat. No. 3,900,737 to Collier. Each unique exposure system has its own software and format for processing data to instruct the equipment in exposing the blank photomask. As the E-beam or laser beam is scanned across the blank photomask 10, the exposure system directs the E-beam or laser beam at addressable locations on the photomask as defined by the electronic data file. The areas of the photosensitive resist material that are exposed to the E-beam or laser beam become soluble while the unexposed portions remain insoluble. In order to determine where the E-beam or laser beam should expose the photoresist 14 on the blank photomask 10, and where it should not, appropriate instructions in the form of a jobdeck need to be provided to the processing equipment.

After the exposure system has scanned the desired image onto the photosensitive resist material 14, as shown in FIG. 2, the soluble photosensitive resist material is removed by means well known in the art, and the unexposed, insoluble photosensitive resist material 14' remains adhered to the opaque material 13 and 12. Thus, the pattern to be formed on the photomask 10 is formed by the remaining photosensitive resist material 14'.

The pattern is then transferred from the remaining photoresist material 14' to the photomask 10 via known etch processes to remove the antireflective material 13 and opaque materials 12 in regions which are not covered by the remaining photoresist 14'. There is a wide variety of etching processes known in the art, including dry etching as well as wet etching, and thus a wide variety of equipment is used to perform such etching. After etching is complete, the remaining photoresist material 14' is stripped or removed and the photomask is completed, as shown in FIG. 3. In the completed photomask, the pattern as previously reflected by the remaining antireflective material 13' and opaque materials 12' are located in regions where the remaining photoresist 14' remain after the soluble materials were removed in prior steps.

In order to determine if there are any unacceptable defects in a particular photomask, it is necessary to inspect the photomasks. A defect is any flaw affecting the geometry. This includes undesirable chrome areas (chrome spots, chrome extensions, chrome bridging between geometry) or unwanted clear areas (pin holes, clear extensions, clear breaks). A defect can cause the customer's circuit not to function. The customer will indicate in its defect specification the size of defects that will affect their process. All defects of that size and larger must be repaired, or if they cannot be repaired, the mask must be rejected and rewritten.

Typically, automated mask inspection systems, such as those manufactured by KLA-Tencor or Applied Materials, are used to detect defects. Such automated systems direct an illumination beam at the photomask and detect the intensity of the portion of the light beam transmitted through and reflected back from the photomask. The detected light intensity is then compared with expected light intensity, and any deviation is noted as a defect. The details of one system can be found in U.S. Pat. No. 5,563,702 assigned to KLA-Tencor.

After passing inspection, a completed photomask is cleaned of contaminants. Next, a pellicle may be applied to the completed photomask to protect its critical pattern region from airborne contamination. Subsequent through pellicle defect inspection may be performed. In some instances, the photomask may be cut either before or after a pellicle is applied.

To perform each of the manufacturing steps described above, a semiconductor manufacturer (e.g., customer) must first provide a photomask manufacturer with different types of data relating to the photomask to be manufactured. In this regard, a customer typically provides a photomask order which includes various types of information and data which are needed to manufacture and process the photomask, including, for example, data relating to the design of the photomask, materials to be used, delivery dates, billing information and other information needed to process the order and manufacture the photomask.

A long standing problem in the manufacture of photomasks is the amount of time it takes to manufacture a photomask from the time a photomask order is received from a customer. In this regard, the overall time it takes to process a photomask order and manufacture a photomask can be lengthy, and thus, the overall output of photomasks is not maximized. Part of this problem is attributable to the fact that many customers who order photomasks often place their orders in a variety of different formats which are often not compatible with the photomask manufacturer's computer system and/or manufacturing equipment. Accordingly, the photomask manufacturer is often required to reformat the order data and condition, convert, and/or supplement it to a different format which is compatible with its computer system and/or manufacturing equipment, which can take a great deal of time, and thus, delay the time it takes to manufacture a photomask.

In an attempt to address these problems, the photomask industry has developed various standard photomask order formats in which photomask orders should be placed. For example, the SEMI P-10 standard is one standard format used in the manufacture of photomasks. Additionally, a few semiconductor manufacturers have developed their own proprietary photomask order format in which photomask orders are to be placed, rather than adopting a standard format. These standard and proprietary photomask order formats were created so that photomask orders would be received from customers in a uniform format, thereby reducing the overall time it takes to manufacture a photomask.

Although the use of such standard and/or proprietary photomask order formats are useful in reducing the time it takes to manufacture photomasks, many semiconductor manufacturers have been reluctant to place their photomask orders in such standard and/or proprietary formats for a variety of reasons. For example, the SEMI P-10 standard order format is quite complicated and requires the customer placing the order to have a sophisticated working knowledge of the requirements associated with such standard. Since many semiconductor manufacturers do not manufacture photomask, such manufacturers may not have the resources, time or ability to learn the intricacies of such standard format. Thus, semiconductor manufacturers often provide a photomask manufacturer with photomask order data in an unorganized and often incomplete manner. As a result, the photomask manufacturer is required to parse through this data and organize it in a useful format (e.g., in the SEMI P-10 format). Additionally, in those instances where incomplete photomask order data is provided to a photomask manufacturer, such manufacturer will be required to request the missing information from the customer. As a result, a great deal of time is often wasted in the process of obtaining a complete and accurate photomask order, and thus, the overall time that it takes to manufacturer a photomask can be greatly delayed. There has been a long felt need in the field of photomask manufacture for a customer side system and method for automatically generating a complete and accurate photomask order in a standard and/or proprietary format.

In the past, AlignRite Corporation (a predecessor organization to Photronics, Inc.), attempted to expedite the delivery of the electronic data through the use of an Internet based delivery system. However, although the AlignRite System was capable of rapid delivery of the photomask data from a customer to the computer system of the photomask manufacturer and was capable of validating the accuracy of this data in real time, this prior system did not provide for the automated generation of photomask order data in a single standard and/or proprietary format. In this regard, once the data was received from the customer, standard modifications to the data would also have to be entered manually by operators. Each time a manual change would have to be entered, the risk of human error increased and the overall length of the job would be extended.

Others have disclosed systems in which manufacturing and billing data are down-loaded over the Internet and verified on-line automatically. One such system is described in PCT Publication Number 02/03141, published on Jan. 10, 2002 to DuPont Photomask, Inc. More particularly, the DuPont Publication discloses a system in which photomask order data is entered on-line by a customer and transmitted to a photomask manufacturer for processing. In this system, a customer is prompted to enter photomask order data. Such data is transmitted to a photomask manufacturer, who in turn performs a diagnostic evaluation of the data. If any data is incomplete or inaccurate, the system sends a message to the customer notifying him of such error. Thereafter, the user must correct the error. After the data has been validated by the manufacturer (and corrected when necessary), the manufacturer processes this data and puts it into a standard (or proprietary) format, such as the SEMI P-10 standard format.

Although useful for diagnostic purposes, the system of the DuPont PCT Publication is very cumbersome and provides a user with very little flexibility in formulating a photomask order or in using information previously entered in prior orders. Further, the system of the DuPont PCT Publication also requires a user to interact through a predefined graphical user interface ("GUI") which is particularly cumbersome and limiting on the user. Thus, there is a long felt need for a system and method which generates photomask orders that are simple and flexible, and avoid the necessity of reentering the data previously used in prior photomask orders.

After the manufacturing steps described above are completed, the completed photomask is sent to a customer for use to manufacture semiconductor and other products. In particular, photomasks are commonly used in the semiconductor industry to transfer micro-scale images defining a semiconductor circuit onto a silicon or gallium arsenide substrate or wafer. The process for transferring an image from a photomask to a silicon substrate or wafer is commonly referred to as lithography or microlithography. Typically, as shown in FIG. 4, the semiconductor manufacturing process comprises the steps of deposition, photolithography, and etching. During deposition, a layer of either electrically insulating or electrically conductive material (like a metal, polysilicon or oxide) is deposited on the surface of a silicon wafer. This material is then coated with a photosensitive resist. The photomask is then used much the same way a photographic negative is used to make a photograph. Photolithography involves projecting the image on the photomask onto the wafer. If the image on the photomask is projected several times side by side onto the wafer, this is known as stepping and the photomask is called a reticle.

As shown in FIG. 5, to create an image 21 on a semiconductor wafer 20, a photomask 10 is interposed between the semiconductor wafer 20, which includes a layer of photosensitive material, and an optical system 22. Energy generated by an energy source 23, commonly referred to as a Stepper, is inhibited from passing through the areas of the photomask 10 where the opaque material is present. Energy from the Stepper 23 passes through the transparent portions of the quartz substrate 11 not covered by the opaque material 12 and the antireflective material 13. The optical system 22 projects a scaled image 24 of the pattern of the opaque material 12 and 13 onto the semiconductor wafer 20 and causes a reaction in the photosensitive material on the semiconductor wafer. The solubility of the photosensitive material is changed in areas exposed to the energy. In the case of a positive photolithographic process, the exposed photosensitive material becomes soluble and can be removed. In the case of a negative photolithographic process, the exposed photosensitive material becomes insoluble and unexposed soluble photosensitive material is removed.

After the soluble photosensitive material is removed, the image or pattern formed in the insoluble photosensitive material is transferred to the substrate by a process well known in the art which is commonly referred to as etching. Once the pattern is etched onto the substrate material, the remaining resist is removed resulting in a finished product. A new layer of material and resist is then deposited on the wafer and the image on the next photomask is projected onto it. Again the wafer is developed and etched. This process is repeated until the circuit is complete. Because, in a typical semiconductor device many layers may be deposited, many different photomasks may be necessary for the manufacture of even a single semiconductor device. Indeed, if more than one piece of equipment is used by a semiconductor manufacturer to manufacturer a semiconductor device, it is possible more than one photomask may be needed, even for each layer. Furthermore, because different types of equipment may also be used to expose the photoresist in the different production lines, even the multiple identical photomask patterns may require additional variations in sizing, orientation, scaling and other attributes to account for differences in the semiconductor manufacturing equipment. Similar adjustments may also be necessary to account for differences in the photomask manufacturer's lithography equipment. These differences need to be accounted for in the photomask manufacturing process.

While the prior art is of interest, the known methods and apparatus of the prior art present several limitations which the present invention seeks to overcome.

In particular, it is an object of the present invention to provide a rule-based system and method for automatically generating a photomask order which is user friendly and avoids the necessity of re-entering data previously entered in the same or another order.

It is another object of the present invention to provide a rule-based system and method for automatically generating a photomask order which does not require the user to interact through a predefined graphical user interface.

It is another object of the present invention to provide a rule-based photomask order system and method for reducing photomask order and data entry times.

It is another object of the present invention to provide a rule-based photomask order system and method for reducing transcription errors associated with the manual entry of photomask orders.

It is another object of the present invention to provide a rule-based photomask order system and method for increasing the overall output of photomasks being manufactured.

It is another object of the present invention to solve the shortcomings of the prior art.

Other objects will become apparent from the foregoing description.

SUMMARY OF THE INVENTION

A system for generating photomask orders in a specified format according to an exemplary embodiment of the invention includes at least one template or order for entry and storage of photomask order data, wherein the at least one template or order is created based upon requirements of a specified photomask order format, at least one set of rules corresponding to the at least one template or order, wherein a user can access the at least one template or order to enter photomask order data and create an order in a specified format. Photomask order data may be entered based on prompting by a graphical user interface or by the use of scripted commands. Partial or complete photomask orders may also be imported electronically, e.g., by scanning and or conversion from other file formats. Once entered, the photomask order may be further modified or submitted without further modification. When a photomask order is entered, the information associated with that order may be transferred electronically to a photomask manufacturer.

A system for generating photomask orders in a specified format according to another exemplary embodiment of the invention includes at least one template or order for entry and storage of photomask order data, wherein the at least one template or order is created based upon requirements of a specified photomask order format, at least one set of rules corresponding to the at least one template or order, wherein the template or order is comprised of components and subcomponents and the subcomponents may be separately stored from the template or order. In one embodiment, the components and the subcomponents may comprise of references to specification grades. In this manner, large numbers of templates and/or orders can be updated simply by updating a specification grade. Specification grades can include measurement tolerances, acceptable defect rates, materials, accounting information, customer service information, customer equipment, lithography pattern placement, data transmission information and vendor specific information, to name a few.

A method for generating photomask orders in a specified format according to another exemplary embodiment of the invention comprises importing electronic information associated with a photomask order; converting said electronic information into photomask order data which is used to populate at least some fields associated with a template or an order; and generating said photomask order using said template or order.

In yet another embodiment, a method for generating a photomask order in a specified format, comprises receiving at least one command by a commercial line generator associated with an order or a template; applying said at least one command to said order or template; and generating said photomask order from said order or template.

A system for generating a photomask order in a specified format in accordance with another embodiment of the present invention comprises a computer readable medium capable of performing the following steps: importing electronic information associated with a photomask order; converting said electronic information into photomask order data which is used to populate at least some fields associated with a template or order; and generating said photomask order using said template order.

A system for generating a photomask order in a specified format in accordance with another embodiment of the present invention comprises a computer readable medium capable of performing the following steps: receiving at least one command by a commercial line generator associated with an order or a template; applying said at least one command to said order or template; generating said photomask order from said order or template.

A system for generating photomask orders comprises at least one template or order for entry and storage of photomask order data, wherein the at least one template or order is created based upon requirements of a specified photomask order format; a rule generator for creating at least one set of rules corresponding to the at least one template or order, wherein the at least one set of rules ensures that a user enter complete information into the at least one template or order as required by said specified photomask order format; and a command line processor for receiving and executing one or more script commands to enter or modify the photomask order data in the at least one template or order.

A system for generating photomask orders comprises at least one template or order for entry and storage of photomask order data, wherein the at least one templates or order is created based upon requirements of a specified photomask order format, and wherein the at least one template or order is associated with one or more components and subcomponents, which can be stored separately from the at least one template or order; and a rule generator for creating at least one set of rules corresponding to the at least one template or order, wherein the at least one set of rules ensures that a user enter complete information into the at least one template or order as required by the specified photomask order format.

A system for generating photomask orders comprises at least one template or order for entry and storage of photomask order data, wherein the at least one templates or order is created based upon requirements of a specified photomask order format; a rule generator for creating at least one set of rules corresponding to the at least one template or order, wherein the at least one set of rules ensures that a user enter complete information into the at least one template or order as required by the specified order format; and at least one specification grades file for storing at least one reference data which is associated with the at least one template or order, wherein the at least one template or order comprises a reference to the at least one specification grades file.

A method for generating a photomask order comprises the steps of importing electronic information associated with the photomask order; converting the electronic information into photomask order data to create at least one template or order; and generating the photomask order based on the at least one template or order.

A method for generating a photomask order comprises the steps of receiving at least one script command; executing the at least one script command to create or modify at least one template or order; and generating the photomask order based on the at least one order or template.

A system for generating a photomask order comprises a computer readable medium capable of performing the steps of importing electronic information associated with the photomask order; converting the electronic information into photomask order data to create at least one template or order; and generating said photomask order based on the at least one template or order.

A system for generating a photomask order comprises a computer readable medium capable of performing the steps of receiving at least one script command; executing the at least one script command to create or modify at least one template or order; and generating the photomask order based on the at least one order or template.

BRIEF DESCRIPTION OF THE DRAWINGS

The above and related objects, features and advantages of the present invention will be more fully understood by reference to the following, detailed description of the preferred, albeit illustrative, embodiment of the present invention when taken in conjunction with the accompanying figures, wherein.

DETAIL DESCRIPTION OF THE PREFERRED EMBODIMENT(S)

Figure 1:
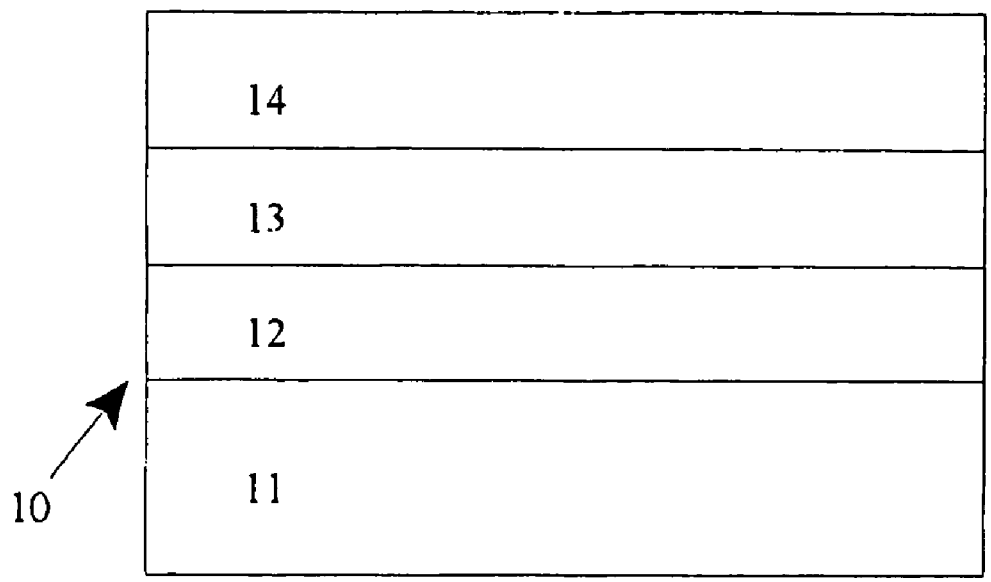
FIG. 1 represents a blank or undeveloped photomask of the prior art.
Figure 2:
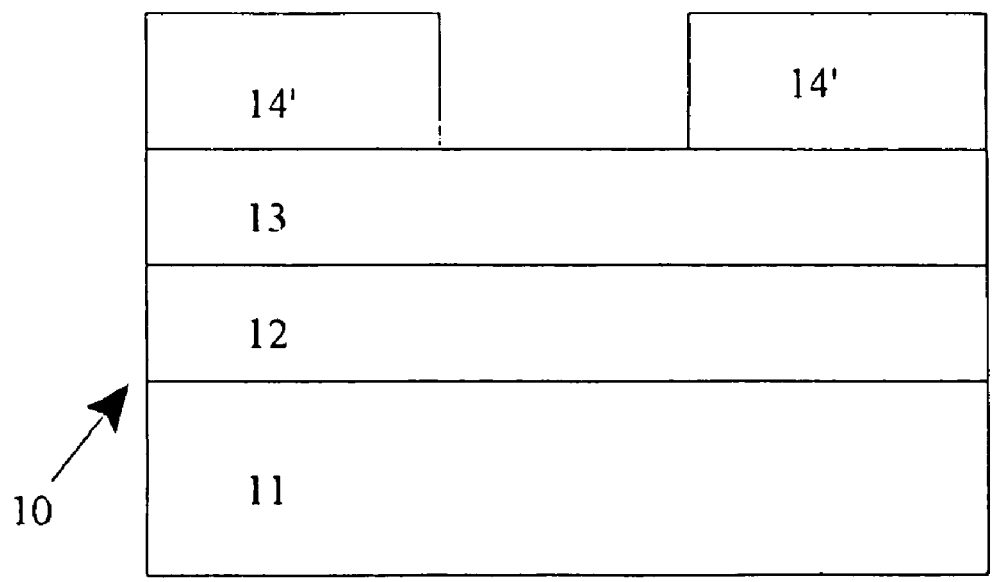
FIG. 2 represents the photomask of FIG. 1 after it has been partially processed.
Figure 3:
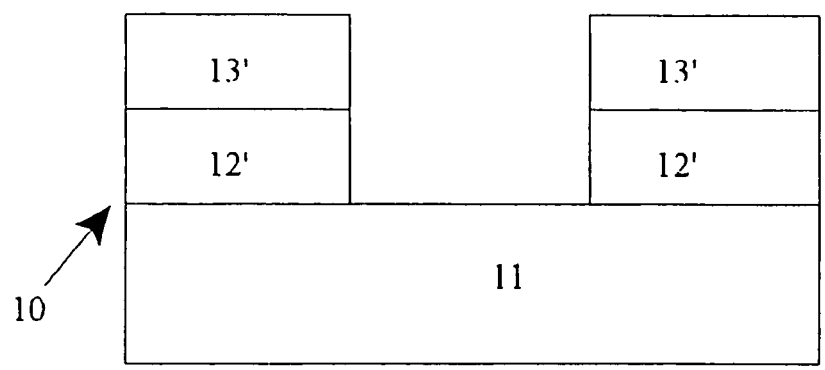
FIG. 3 represents the photomask of FIGS. 1 and 2 after it has been fully processed.
Figure 4:
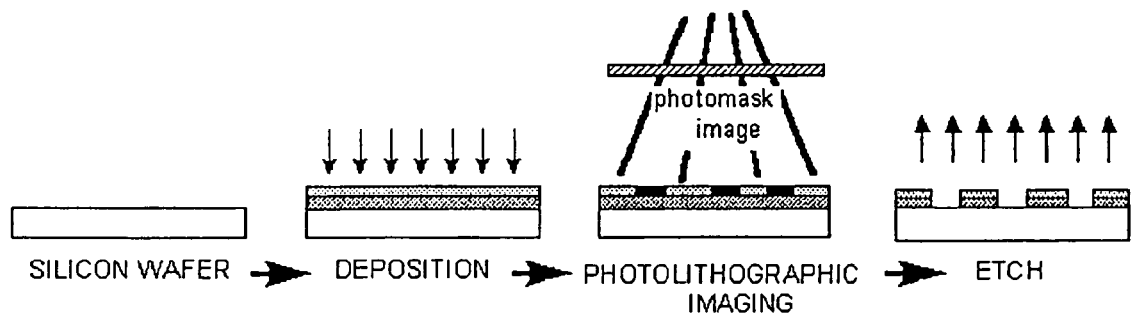
FIG. 4 is a flowchart showing the method of using a processed photomask to make or process a semiconductor wafer.
Figure 5:
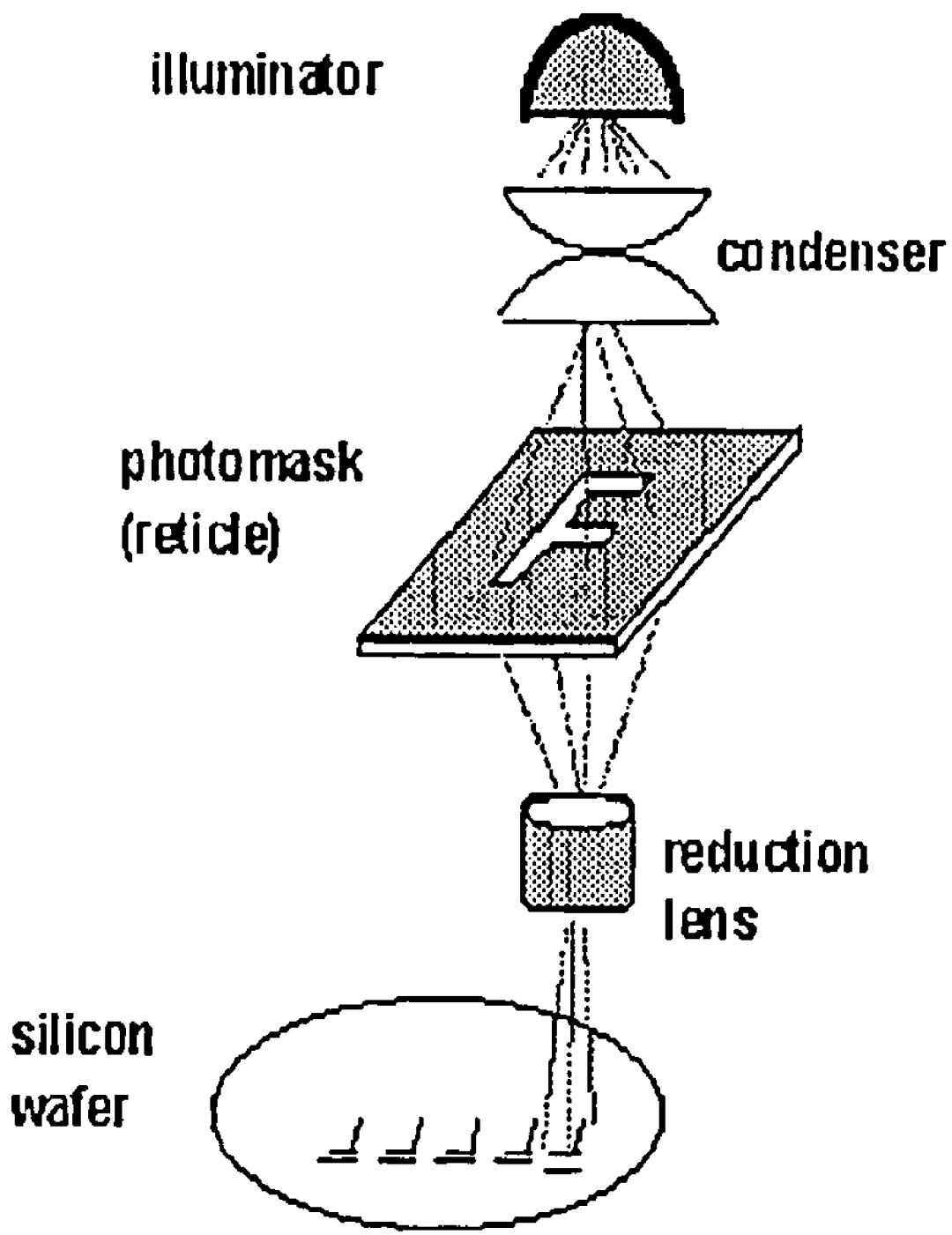
FIG. 5 shows the process of making a semiconductor using a wafer stepper.

The present invention relates to a computerized rule-based system and method for automatically generating photomask orders in a specified format, wherein a photomask customer desiring to place an order for a photomask may be guided through the process of entering an order in a complete and accurate manner in accordance with the requirements of the specified order format. To carry out these functions, the system and method utilize the following five components to generate a photomask order into a desired format: (1) templates in which data is entered; (2) rules for converting the data entered in the templates into a specified standard and/or proprietary format; (3) a method for using templates to create a photomask order in a specified format; (4) a separate set of rules for validating photomask order against a specified standard format; and (5) specification grades which are one or more unique attribute objects associated with a photomask template or order and may be referenced by a template or order. Software is implemented in this system to associate specific templates with specific rules to ensure that a customer enters complete and accurate photomask order information. Likewise, software is implemented in the system of the present invention to associate specific photomask orders with specific rules to ensure that a customer enters complete and accurate photomask order information. The specification grades can be treated as reference data and can be applied to a template, order, or template used to create an order. By having templates and orders include specification grades as reference data, one may easily update a large number of templates and/or orders by merely revising only a small number of specification grades.

Before describing this software, it is first necessary to describe the manner in which the templates, orders and rules are stored and organized. More particularly, the system includes a server and an external data storage media stored on the server. Rules and templates for facilitating the entry of photomask order data and for generating an order are stored in the external storage media. The external data storage media may be a variety of different types of storage media, including, but not limited to, a relational database, an object-oriented class, an XML file and other similar storage media now known or hereinafter developed. By maintaining the storage media external to the system and by providing flexibility in the type of storage media that can be used with the system and method of the present invention, a variety of different users and automated systems may operate the system dynamically across a variety of different platforms.

In a preferred embodiment, a set of templates and orders are created based on the requirements of a particular standard and/or proprietary photomask order format. In this regard, the templates and orders are organized as a hierarchy of components and subcomponents, wherein each component and subcomponent is defined by the requirements of a particular standard and/or proprietary photomask order format. For example, a particular photomask order format may require that the mask data component include certain subcomponents, such as a title, barcode and pattern data, to name a few. Each of these subcomponents may have further detailed subcomponents ("child component"). For example, the pattern data component, which is a subcomponent of the mask data component, may have a set of child components associated therewith. Depending upon the requirements of the standard and/or proprietary photomask order format, these child components may have additional subcomponents as well, which can in turn, have their own subcomponents and so forth and so on.

Each of the components and their associated subcomponents is defined by a set of attributes (e.g., binary, string, integer, real number, date, Boolean, list, etc.). Since templates are used to create photomask orders, the rules (discussed in more detail below) associated with any given template are a subset of the rules associated with the photomask order that is created from the template. Under the present invention, templates, orders, components, subcomponents, etc. may each be stored separately. This will allow the user to leave certain components or subcomponents out of a template and have these separately stored components or subcomponents referenced by the template as specification grades. In the event new order created from the given template requires changes in these components or subcomponents, one only needs to make changes to the separately stored specification grades without having to make any changes to the template.

Table 1 demonstrates an example of how the components and subcomponents of the templates and orders may be organized according to a standard and/or proprietary photomask order format:

TABLE 1

Order
- Supplied
- Pattern Data
- Pattern Group
    - Pattern Placement
- Mask Data
    - Title
    - Barcode
    - OPC Definition
    - Array Registration
    - Measure File
    - Registration
    - Die to Data Inspection
    - Die to Die Inspection
    - Surface Definition
    - Visual Inspection
    - Pattern
        - Critical Dimension
        - Die to Die Inspection
        - Die to Data Inspection
    - Field
        - Pattern
            - Critical Dimension
            - Die to Die Inspection
            - Die to Data Inspection In Table 1, the entry in the first (left-most) column is a parent of the entry in the second column (child), and the entry in the second column is a parent of the entry in the third column, and so on. Alternatively, any two adjacent columns in TABLE 1 may define components (left column) and subcomponents (right column). As illustrated in Table 1, the same components may appear as subcomponents to other components. For example, Critical Dimension data appears as a subcomponent to Pattern data in column 4 and column 5 of Table 1. Since each component and its associated subcomponents may be stored separately from each other and from an order or a template, any of them may also be copied from one portion of an order to another portion of the same order or a different order, template, component, subcomponent, etc. This flexibility in copying and pasting components and subcomponents allows a user to quickly create many photomask orders without having to re-enter the same order information.

Figure 7:
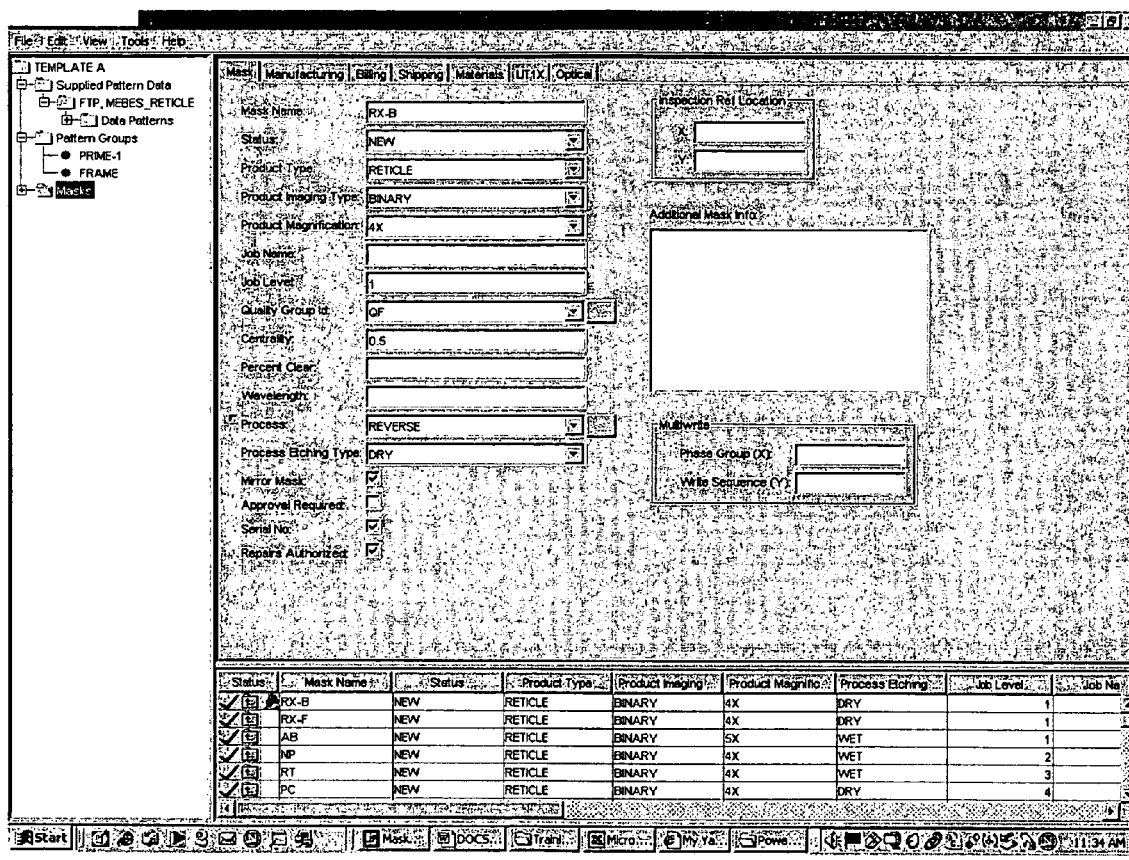
FIG. 7 shows an example of a graphical user interface used with the invention to guide a user to enter specified data.

Templates and orders may be created manually using a graphical user interface. When a GUI is used, a user may be prompted by the GUI to enter specifically enumerated data. FIG. 7 is a typical GUI that can be used by a photomask order generating system. In this example, the GUI shown in FIG. 7 prompts the user to enter descriptive information relating to the mask to be ordered. In this example, information including mask name, status, product type, to name a few is entered. In some instances such as with mask name the information is directly typed in. In other instances, the information may be selected from a drop down menu, such as the case with the product type category.

Templates and orders may also be automatically created or modified using information from other, external media, including, but not limited to, non-formatted text files, XML files, or some type of data storage device or mechanism. For example, a customer's computer may include such files, databases or other electronic information that would be useful in creating a new template or order or providing missing information for an existing template or order. Similarly, an order template, component, subcomponent, etc. may be imported electronically by, for example, a scanner, or other file conversion technique such that a pre-existing order, template, component or subcomponent could be converted and reformatted for use by the photomask order generating system. For example, a translation or mapping software could be used to convert the customer's files or databases into a format which would be needed for the application. A commercially available example of such software is Data Junction, a visual design tool for rapidly integrating and transforming data between hundreds of applications and structured data formats. However, any appropriate commercial or proprietary translation or mapping software could be used to accomplish this task. The external information may be imported into the templates or orders either locally through the order processing system, or via an existing network connection, such as a wide area network or local area network or the internet, etc., by various data transfer techniques such as FTP protocol, e-mail, http, proprietary protocols, or any other known protocols.

All operations performed by a person via a graphical user interface may also be performed, at least in part, in an automated manner without direct human interaction. Under the present invention, this can be achieved by the scripting technique based on a plain-text instruction set or command line. A plain text instruction set is a high level programming language which can be interpreted into the application programming interface to instruct the application to perform a series of operations. For example, a command line stating "replace device name 'Device A' with device name 'Device B'" could be sent to the system by a user at the customer's network, or automatically as detailed herein. When the system receives this command line, it would replace the device name in a specific template or order with the new device name. Of course, this is merely one example of how an instruction set could be used, and is not meant to be limiting within the scope of the present invention. Custom modules may be created for use on the customer's system to access this instruction using any programming language capable of producing an ASCII or binary file and executing an operating system command. Automated implementation will allow access by authorized users to any authorized system via an existing network connection. Typical security measures such as firewalls, log-ins, passwords, etc. can be used to protect the confidentiality and data security of the database and mask ordering system.

Thus, orders, templates, components, subcomponents, etc. may be generated and/or modified by using the scripting technique via a command line or some other development environment. Preferably, the scripting technique involves a command-line program which takes as an argument the name of a script entered by a user that contains a number of commands to manipulate orders, templates, components and/or subcomponents, etc. in some specified manner. Preferably, some or all of the editing functionality that is available to the user via a graphical user interface can also be made available in the scripting technique via script commands.

In a preferred embodiment, script commands may be used for such editing functions as creating new orders, editing existing orders, creating orders from templates, adding new components or subcomponents to an order, template, components, or subcomponents, modifying components or subcomponents, saving orders, creating SEMI P-10 files or files in other comparable format or standard from orders, to name a few. In addition, the scripting technique could be made capable of querying data and making batch edits to multiple orders and templates at the same time.

A script file used in the scripting technique may be in the form of a plain text file that contains one or more script commands. A script command may include such functions as variable declaration, assignment, function call, if-statement, for- or foreach-statement, while-statement, and include, to name a few. The variable declaration command is used to declare, before its use, a variable to be used to store a data value for later use. The variable declaration command may comprise a declaration of a data type of the variable to be used. The data type of a variable may be one of the followings: string, number, Boolean, date, list, treeitem. A string may represent a sequence of zero or more characters. A number may represent either a whole or fractional number of any practical size which may be either positive, zero, or negative. A Boolean may represent either true or false. A date may represent a specific day and may also include time of the day. A list may represent a list of values of the same data type. A treeitem may represent an object from the tree hierarchy of the photomask ordering system, such as an order, a photomask, a template, or a pattern, etc.

With the function call command, a call can be made to a function in the system library. Functions that can be called from the system library may include the functions for the general management of orders, templates, components, and subcomponents, the functions for dealing with individual treeitems, the functions for dealing with the fields of a particular treeitem, the functions for dealing with date values, the functions for manipulating lists of values, and any other general or specific purpose functions.

Examples of the function calls for the general management of orders, templates, components, and subcomponents may include, but are not limited to: create order (to create a new empty order), create order from template (to create a new order from a given template), open order (to open an existing order), create template (to create a new template), open template (to open an existing template for editing), apply date schedule (to apply a given pre-existing date schedule to an order or template starting from a specified date), save (to save the changes to an order template to the database), create SEMI P-10 file (to create a "SEMI P-10" file from a given order), create and send SEMI P-10 file (to create a SEMI P-10 file from a given order and send it via a specified transfer method, e.g., FTP over the internet, to a specified location), delete order (to delete specified order from the database), delete template (to delete a specified template from the database), to name a few.

Examples of the function calls for dealing with individual treeitems may include, but are not limited to: create treeitem (to create a new, blank treeitem of the specified type), copy treeitem (to create an exact copy of a treeitem, including its associated child treeitems), find treeitem (to locate a treeitem of a given type anywhere beneath another treeitem satisfying a certain given criteria), find treeitems (to find all treeitems that meet a certain given criteria), get parent (to obtain the parent treeitem of a given treeitem), replace in tree (to replace a given piece of text in all text fields within the specific types of treeitem starting from a specific object), to name a few.

Examples of the function calls for dealing with the fields of a treeitem may include, but are not limited to: get field (to obtain the value of a treeitem field), set field (to set the value of a treeitem field), add field item (to add a new value to a treeitem field that is of type list), remove field item (to remove an item from a treeitem field of type list), to name a few.

Examples of the function calls for dealing with date values may include, but are not limited to: create date (to create a new date with a specified value), date add (to add the specified time period to a date), date subtract (to subtract the specified time period from a date), to name a few.

Examples of the function calls for manipulating lists of values may include, but are not limited to: add list item (to add a new item to a list, wherein the new item is of the same data type as other items in the list), remove list item (to remove an item from a list), list contains (to determine whether a specific value is contained in a list), list size (to determine the number of items in the list), to name a few.

Examples of the general or special purpose functions may include, but are not limited to: is null (to determine whether a value is a null value), print (to print a message to the screen), to name a few. Whatever type or form of functionality a user may find desirable can potentially be included as functions in a system library. The list of function calls in a system library may be upgraded or revised at any time.

The assignment command assigns a variable with a new value. The if-statement command allows a script to take decisions based on some criteria. The for- or foreach-statement command allows for an iteration over some specified list. The while command is generic looping construct. The include command specifies that another script should be run at that point.

Potentially, command lines may appear in any order. However, the order is generally required to follow the logic, since the commands are typically executed in sequence. A command line may or may not be case-sensitive, depending on the preference of the system designer.

Comment lines may be included as text in a script file so as to improve the readability of the script file by explaining in plain English what is being done. Typically, when comment lines are included in a script file, that information will be ignored when the script file is executed. Further, a script file may be formatted to allow a user to include white space or blank carriage returns to facilitate the readability of the file without impacting on the execution of the script file.

Once generated, either in whole or in part, in one embodiment of the disclosed system, the orders, templates, components and/or subcomponent may be transferred to or accessed by different users of the system of the present invention, or different systems of the present invention. For example, one user at a customer may e-mail or otherwise transfer a template or order to a different user at that customer or at a different customer so that the transferred template or order could be used to make a new or modified template or order. Of course, such transfer may occur by other methods of transfer such as FTP protocol, or transport on a disk or other storage medium, etc. As a security measure, access codes or other access limiting techniques may be applied to orders, templates, components and/or subcomponents, etc. to prevent unauthorized access and/or modification.

When making a photomask order, customers may not have access to, or knowledge of, all required information to complete an order. In the past, the lack of such information would delay the order completion process and require that such information be manually collected from appropriate sources.

Under one embodiment of the present invention, such information is automatically retrieved, at least in part, from other sources which have the required information and require little, or no input on the part of the customer. For example, in the event that the information required to be entered into an order which are governed by a first set of rules is unavailable to the customer, the data processing mechanism of the present invention can access a data-service that will provide the capability to search for this required information. An example of such a data-service would include ServiceObjects, which enables users to simultaneously access Internet sites, databases, intranets and other internal and external resources as if the content existed in a single location and to package information, such as shipping information, in a format that can be accessed by other programs. In this example, the application would send a data query to the data-service seeking specific shipping options that may be available for the photomask being ordered. The data-service would, in turn, send the requested information back to the application, which would then provide such information to the customer using the application. Other types of data-services could also be applied to such information as logistics, inventories, supply characteristics, equipment availability, run times, tool up time, level loading, capacity information, or any other such information that a customer would desire in order to prepare a specific photomask order. Script commands may also be created to access data through a data service or otherwise.

The data-service may be located either locally on the customer's computer or network, or remotely from the customer's order processing system, and may itself access data from any number or type of remote computer systems (e.g., the logistic vendor's computer system, the parts supplier's computer system, the equipment supplier's computer system, the photomask manufacturer's computer system, etc.) through an interface known to both the application software and the data-service, and can use any number of acceptable protocols, including, for example, SOAP, XML, XML-RPC, ebXML, HTML, etc. The data-service may search (e.g., by query) these remote systems for the information not available to the customer, and if available, retrieve such data. Optionally, the data-service can be configured to verify data, if so desired. The data-service's search mechanism may be configurable based on the user's desired information (e.g., logistics, supply, processing time, etc.) based on any number of possible parameters (e.g., costs, time, customer name, mask size, stepper equipment to be used, etc.) provided by the user's system.

Figure 6:
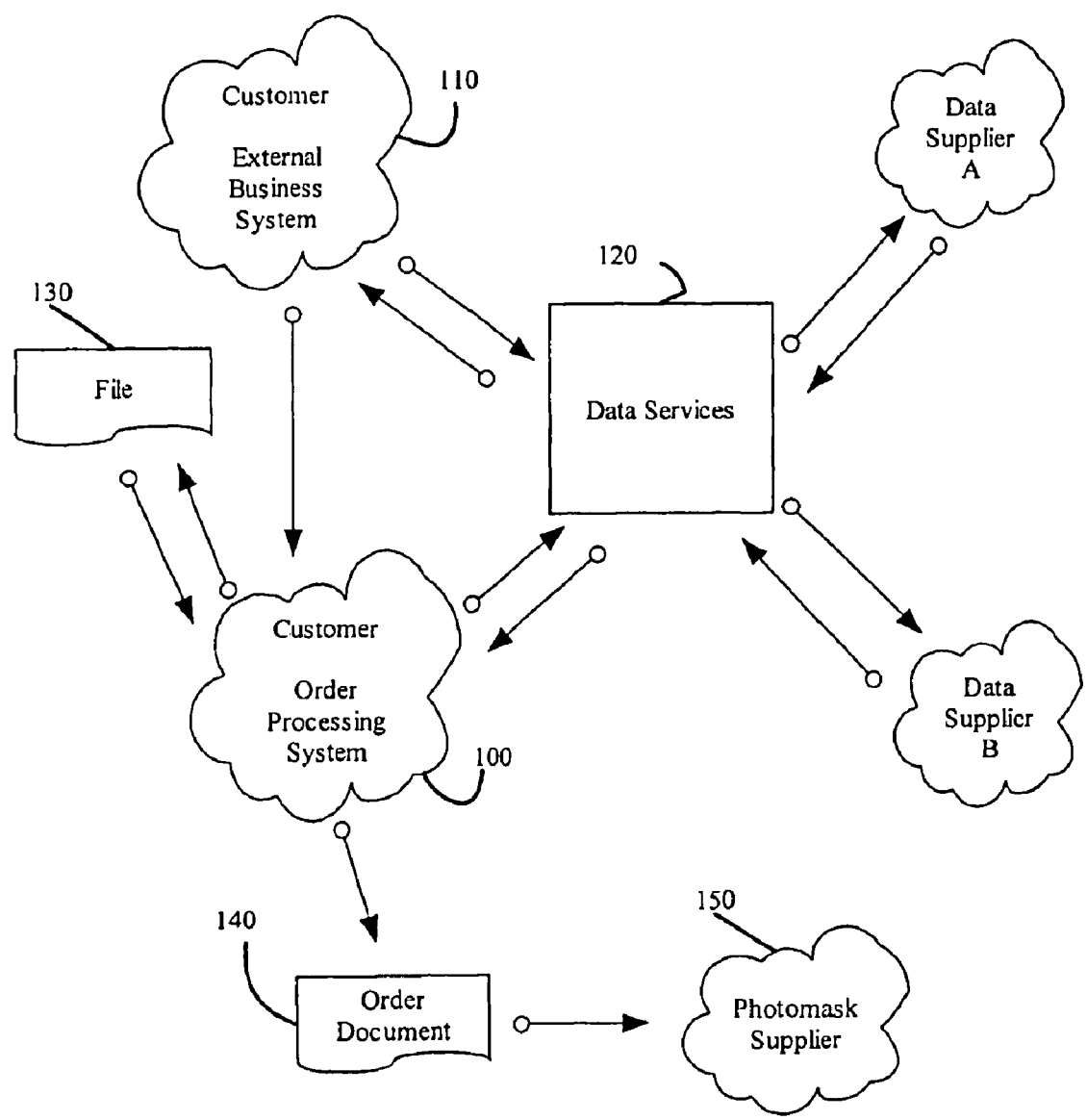
FIG. 6 shows a photomask order generating system according to an exemplary embodiment of the invention.

FIG. 6 illustrates an example of various potential embodiments of the automated features of the present invention. As shown in FIG. 6, the customer 110 has installed on its computer system or network an order processing system 100 consistent with the present invention. A user of this system may input a partial or complete order or template in the manner described above. A file 130 located on the customer's network is used to create or modify the template or order. To the extent that any information necessary to complete the order is not inputted directly by the customer, such information may be automatically retrieved by the order processing system 100 automatically from files, databases, or other electronic information available on the customer system; from a system external to the customer which can be accessed remotely; from one or more suppliers or vendors of the customer either directly; and/or through a data-service system. The customer may either input directly all the information necessary to complete an order, some of the information necessary to complete an order with the remainder coming from these other sources, or through an external program initiate a process which will automatically generate a complete order without having to access the graphical user interface of the order processing system. In the embodiment shown in FIG. 6, the information necessary to complete an order is retrieved from a data-services system 120. The data-services system 120 queries configured resources, such as data suppliers A and B, which can be, for example, suppliers or vendors of the customer. The data-services system 120 may also gather information from the customer itself. Once all the necessary information is retrieved and entered into the proper template, an order document 140 is generated which is sent to the photomask supplier 150.

The execution of any task in an automated manner, may include alert notification of any system failure or process invalidation based on either sets of rules. Notification is configurable by the end user, and may be in the form of email, messaging, log files or database entries. In one embodiment, the notification feature automatically generates a message sent to a distribution list of the names of people who will be involved in the ordering of the photomask. This distribution list can be established by any predetermined criteria. Once the message is generated, each person on the distribution list may be automatically notified that an order for a photomask has been generated. Such notifications may include e-mail, beepers, mobile telephones, etc. This automatic notification process can be set up anywhere in the customer's network or even the manufacturer's network and be triggered by any step that the customer desires. This example should not be treated as limiting to the present invention and is merely illustrative of the type of notification system that can be incorporated with the present invention.

Upon notification of the preparation of a new or modified photomask order, the present invention can automatically forward the order to the photomask manufacturer, if no errors are present, or may wait for authorization from a user of the customer system. If errors are identified, the customer may then manually edit the order to fix such errors, and continue to process the order in a normal manner.

In another embodiment, an incomplete photomask order may be generated, including design information in a format which can be transferred to the photomask manufacturer's processing system to allow the photomask manufacturer to verify the validity, feasibility and/or desirability of the design. For example, a customer may transfer a partial photomask order including fracture instructions which could then be transmitted to the photomask manufacturer to be analyzed for validity, feasibility and/or desirability of the proposed design. This could be done either automatically as described above, or manually. If automated, upon receipt of information regarding a proposed partial photomask order, the system could generate the information necessary to submit fracture instructions to a photomask supplier for further analysis and evaluation. Upon submission of the information, the photomask manufacturer may then also propose alternative designs which may be more feasible or desirable from the manufactures' perspective or otherwise. The results of the photomask manufacturer's analysis may then be transmitted to the customer computer system for further consideration by the customer on whether to go forward with the order or modify the proposed order.

Preferably, each of the templates, orders, components, and subcomponents, etc. is stored in a database, but may also be stored in other locations. A search engine may be provided on which users can search for a particular template, order, component, or subcomponent, etc. stored in the database or other locations. Using the search engine, the user can locate the appropriate templates, components, or subcomponents, etc. that are needed to generate a photomask in a particular order format. Once such templates, components, subcomponents, etc. are located, data relating to a photomask order is entered by a user (typically, a photomask customer desiring to place an order for a photomask). The user can also use the search engine to locate existing photomask orders for the purpose of completing or facilitating the data entry or modifying their content, as described below.

As noted above, a customer may not have sufficient knowledge of the requirements of a particular photomask order format, and thus, may not enter all necessary information required by such standards to complete an order. Additionally, customers are prone to making data entry errors, and thus, may provide inaccurate information. Accordingly, a first and second set of rules are established and stored on the system to ensure that the customer enter complete and accurate data into the templates and orders, as required by a particular standard and/or proprietary photomask order format.

In the preferred embodiment, the first set of rules are established to ensure that a user input all necessary data to output a complete photomask order, as specified by a particular standard and/or proprietary photomask order format. Preferably, the first set of rules are established based on the requirements of a selected photomask order format. In this regard, the first set of rules dictates whether data "must" be input, "can" be input and/or "must not" be input into each component and subcomponent of a template or order, as dictated by the specified photomask order format. Additionally, the first set of rules should be configured such that they will require the user to enter information into any other components which are required (as set forth in a particular standard and/or proprietary photomask order format) to complete a photomask order.

Thus, for example, referring to Table 1, a particular standard order format may require, with respect to the "Pattern" template, that for all EAPSM orders: placement data and critical dimensions data must be provided; die to die inspection data may be provided; and die to data cannot be provided. Accordingly, rules are established and associated with the appropriate templates (and components and sub-components) which require that (1) the user "must" include placement data and critical dimension data; (2) the user "can" include die to die inspection data; and (3) the user "must not" include die to data inspection data. Accordingly, in this example, when a user seeks to create an order for an EAPSM using the system and method of the present invention, the rules will (1) require the user to input placement and critical dimension data; (2) permit (but not require) a user to enter die to die inspection data; and (3) preclude a user from entering die to data inspection. Additionally, the selected order format may require that, in addition to the Pattern Data, Array Registration data must also be entered to complete a photomask order. Accordingly, the first set of rules would also be configured such that once the user has completed entering all the pattern data, the user will be guided to the "Array Registration" template and be prompted to enter all required data into that template (and any other corresponding subcomponents of that template) as well. Similarly, if the standard and/or proprietary photomask order format requires the entry of data into any other templates to complete a photomask order, the first set of rules will guide the user to such other templates after the user has entered all data into the Array Registration template, and prompt the user to enter all required data into such template(s). Once the user has entered data in all required templates, the user will be permitted to finalize the template (subject to entering data according to the second set of rules as discussed below).

Thus, as should be apparent, the first set of rules of the present invention ensure that the user enters the necessary information into the appropriate templates as required by a particular standard and/or proprietary format to generate a photomask order. Put another way, the rules guide a user through the process of entering photomask order data to ensure that all necessary order information is entered into the templates.

Additionally, the system and method also provide for a second set of rules which ensure that a user input data in an accurate and proper format, as specified by a particular standard and/or proprietary photomask order format. As noted above, each component and subcomponent of a template is defined by a set of attributes (e.g., binary, string, integer, real number, date, Boolean, list, etc.). Thus, in a preferred embodiment, a second set of rules are established for each template and order that indicates to the user whether the data entered into a particular template or order "must," "can" and/or "must not" have a particular attribute, as required by a particular standard and/or proprietary photomask order format.

For example, referring to Table 1, a particular standard and/or proprietary photomask order format may require that (1) the data entered into the placement template "must" be an integer; (2) the data entered into the title template "can" be a string; and (3) the data entered into the critical dimension template "must not" be a string. Accordingly, a rule is established for the placement template which (1) requires the user to enter an integer in the placement template; (2) allows the user to enter a string into the title template; and (3) prevents the user from entering a string into the critical dimension template. Thus, as should be apparent, the rules of the present invention ensure that the user enter the appropriate type of information and data type into each template as required by a particular standard and/or proprietary photomask order format to generate a photomask order. In other words, the second set of rules only permit the user to enter a certain type of data into a template, and thus, reduce the possibility of having design errors and/or data entry errors in the process of placing a photomask order.

In a preferred embodiment, the first and second set of rules described herein are created and stored separately. As noted above, the rules may be stored either internally in the system or externally from the system in any different number of dynamic formats (e.g., as a database, an object-oriented class, an XML file, etc.) so that the system may be adapted to run on any number of platforms, depending the preferences or a user and/or automated system. It should be noted, however, that a single set of rules can be created and stored, provided that such single set of rules ensures that a user enter both complete photomask order information (as described with reference to the first set of rules) and accurate photomask order information (as described with reference to the second set of rules). Further, the first and second set of rules may be combined as a single set of rules in a similar manner.

As noted above, the present invention includes a function to associate specific first and second sets of rules with specific templates, to ensure that a photomask order is generated in a complete and accurate manner. In the preferred embodiment, this functionality is provided in the form of a software-based application installed on the computer of an entity desiring to place an order for a photomask, such as a semiconductor manufacturer. Unlike the prior art, this software is not dependent on a given photomask manufacturer's manufacturing process. Rather, the software of the present invention can be deployed as a stand-alone secure application, a network distributed application, or a web-based "thin-client" application. Preferably, the software is utilized in a client-server system, wherein a graphical user interface (e.g., the client) connects to and retrieves data from a database on the server. In all cases, the customer running the software of the present invention is not required to access and/or login to any external local area network of a photomask manufacturer to place an order.

The manner in which the software of the present invention associates specific rules with specific templates is now described. In particular, since the templates are hierarchical collections of data, each element of a template is interpreted by an associated software object. In the preferred embodiment, rules are embedded within the software objects and are responsible for the assembly of the data entered in the templates. These rules are constraints or instructions, such as an algorithm, and typically relate to one or more attributes of the software object. Accordingly, with this arrangement, it is possible to enter a complete and accurate photomask order as the rules and templates are appropriately associated with each other.

Additionally, the system is preferably configured to permit the rules and templates to be separately updated should the need arise. In this regard, the current standard photomask order format is known as the SEMI P-10 standard format. However, it is anticipated that as technological advances are made, a new standard format may be developed to cover these advances, and thus, replace the current SEMI P-10 standard format. Additionally, there are currently many other international standard order formats that are used by photomask manufacturers overseas. As with the SEMI P-10 format, it is expected that these international formats will also change or be replaced over time. Thus, the system of the present invention provides for the ability to update the rules and templates to meet these changes. More particularly, the first and second sets of rules are preferably stored as separate files from each of the templates, which are in turn also each stored as separate files. By keeping the rules and templates separate, any modification to one will have no effect on the other. In this regard, when the rules or templates are modified, there will be no need for a correlative code change to a corresponding element where none would be indicated by the proximate feature modification. Additionally, by storing the rules and templates separately, the possibility of the occurrence of a system seize-up (e.g., where unanticipated changes to an embedded or inner-nested element might cause an unanticipated failure) can be avoided. In this regard, if rules and templates were not stored separately, independent modification would be impossible. Each of the existing templates, of which there could be thousands if not more, would then have to be modified individually to include the new rules. Thus, as should be readily apparent, the system and method of the present invention is not limited to any one particular standard format, but rather can be easily adapted to conform to the requirements of any current or newly developed standard photomask order format. Similarly, a customer may change its proprietary order format to meet any changes associated with new developments or improved technologies.

To modify the rules, software objects are established such that the rules contained therein may affect one or more of their attributes, their children or other rules contained within it. In this regard, the rules are established such that only certain specified attributes are affected by rules. Thus, since the software objects, like templates, are hierarchical in nature, they know both their parent and children. Accordingly, any time a child object is modified, it notifies its parent of the area, rules, or attributes impacted by the change. As a result, any change made anywhere within the hierarchy of rules is propagated through the entire family. Accordingly, the rules have the capability to enforce the addition of, or the removal of, any child element of the parent. Thus, within the application, each object is individually updateable or upgradeable through subsequent releases of the software. Additionally, object parents maintain a standard collection for each type of child element, which can be added or removed while the template is being constructed.

Templates can also be modified in response to a modification of a standard and/or proprietary photomask order format which requires the addition of new attributes and/or subcomponents to the hierarchy of orders and templates. In such instances, the new relationships are defined for affected components and/or subcomponents and new rules are dynamically added to the existing rule schema.

To illustrate these features of the present invention, the following example is now described. The current SEMI P-10 standard requires that a photomask order include, among other things: Mask Order [ ], Mask Set [ ], Mask Definition [ ], and Pattern Definition [ ]. Thus, according to this requirement, the following templates would be established: SemiOrder Template, SemiMaskSet Template, SemiMask Template and SemiPattern Template. Additionally, a first and second set of rules for each of these templates would be established which dictate whether data must be entered into each of the templates and the type of data that can be entered into such templates. However, at a later point in time, the SEMI P-10 standard may be replaced by a new standard that requires a CD component. Thus, the existing templates (e.g., SemiPattern) could be modified to include, for example, a critical dimension (CD) component to conform to a modification of the metrology aspect of the SEMI P10 standard. Additionally, a new template could be created to conform to any newly added aspects (e.g., registration) of the new SEMI standard. Similarly, the already existing first and second set of rules could be adapted to meet the changes associated with the modified CD component aspect of the current SEMI P10 standard. Additionally, a new set of first and second set of rules could be created to conform to the new registration feature of the new SEMI standard.

Specification grades may also be used as a mechanism to easily update a specific data entry included in a large number of templates, orders, components, subcomponents, etc. In particular, in one embodiment of the present invention, a specification grades file may include the specific data or objects deemed desirable for future updates in many orders, templates, components, subcomponents, etc. The various orders, templates, components, subcomponents, etc. would then include a reference to the specification grades file for the specific data therein instead of storing the specific data. In this manner, these referenced specific data or objects can be updated in a large number of orders, templates, components, subcomponents, etc. by merely updating the specification grades file, rather than updating all the orders, templates, components, subcomponents, etc. referencing these specific data or objects.

For example, a specification grade may include a standard critical dimension (CD) line width that is considered acceptable to a particular photomask customer at a given time. As the photomask technology continues to develop, the acceptable CD line width will likely undergo changes. Rather than having to individually update each order, templates, component, subcomponents, etc. that specifies a particular CD, the use of the specification grades allows one to update only one specification grades file, and then all the files that refer to that specification grades file will automatically be upgraded. Other examples of appropriate variables to provide as specification grades in the context of a photomask order include: measurement tolerances associated with mask attributes that need to be met by the photomask manufacturer to ensure the mask meets the customer specifications; acceptable defect rates associated with mask attributes that need to be met by the photomask manufacturer to ensure the mask meets the customer specifications; materials (substrate, pellicles) associated with the manufacture of photomasks that must meet quality levels paid for and expected by the customers; accounting information including pricing and billing/shipping information; customer service information such as contact name and phone number, class of machines or specific machines required to meet internal or customer requirements needed in the production of photomasks; Lithography pattern placement information including, but not limited to, data tone, beam exposure, X/Y placement information; data transmission information including, but not limited to, email addresses, FTP addresses, protocol, login ID and password, directory structure; and vendor specific information associated to raw materials used in the manufacture of photomasks including, but not limited to, substrates, pellicles, compacts, resist and unique equipment used in the manufacture such as "Applied Materials Alta 3500" or "KLA Starlight", to name a few.

As discussed above, a template or order is comprised of one or more associated objects, such as components, subcomponents, data, etc. For example, a photomask may have one or more associated attribute objects such as registration, titles, barcodes, etc. In an embodiment of the present invention using the specification grades, a utility may be provided to allow an end-user to create one or more unique data or objects that may be associated to a template or order. These objects will be stored separately from the associated orders and templates. Furthermore, these separately stored objects may have their own set of rules. When a template or an order is created, the end-user may be allowed to associate the template or order with some or all of the objects defined in the utility. Upon generation of a template, order, or an order created from a stored template, all object information stored in the utility that has been associated to the template, order, or template used to create an order may be regarded as reference data and applied to the template, order, or template used to create an order. Reference object information may be updated or removed based on the "roles and responsibility" assigned to the end-user in the application's security module. For example, a less-experienced end-user may be prohibited from overwriting the reference data stored in the utility. On the other hand, an experienced user may be granted a permission to modify the reference data.

Another aspect of the present invention is that it provides for the ability to generate new photomask orders by: (1) merging data into a new order from an already existing template having data contained therein; (2) merging data into a new order from an already existing order having data contained therein; (3) merging data into a new order from already existing templates and orders; or (4) merging data into a new order from already existing orders, templates, components and/or subcomponents. In this regard, whenever a user enters data into either a template or creates an order, such template and/or order is saved on the system of the present invention. Further, as previously discussed, components and subcomponents may be stored separately from an order or template on the system of the present invention. Thereafter, a user is able to access the already existing templates, orders, components, and/or subcomponents, and use the data saved therein to generate a new order. By providing a user of the system of the present invention with the ability to merge data from already existing orders, templates, components, and/or subcomponents, the process for entering photomask order data is greatly reduced, thereby reducing the overall time it takes to manufacture a photomask order. Each of the four methods for merging data into an order is described below.

In one embodiment, to create a new order from an existing template(s), the user is prompted to create a new, blank order. Next, the user is provided with the option of selecting templates and/or orders which were created and saved from a previous photomask order. Depending upon the type of photomask to be manufactured from the new order, the user selects and loads the most relevant template(s) stored in the relational database. The selected template is displayed to the user with previously entered data. For each non-null object within the template (e.g., the object contains data), the user may either select the previously entered data into the new order or over-write this data with new data. Additionally, to the extent that a particular object within a template is null (e.g., it is already empty), the user may enter appropriate data within that object. Next, the rules established for this order operate as described above to ensure that data is accurately and completely entered. Thereafter, the software processes this information and generates a new order based on this information.

The process for creating a new order from an already existing order is similar to the process of creating a new order from an already existing template. In this embodiment, to create a new order from an existing order(s), the user is prompted to create a new, blank order. Next, the user is provided with the option of selecting templates and/or orders which were created and saved from a previous photomask order. Depending upon the type of photomask to be manufactured from the new order, the user selects and loads the relevant order(s) stored in a relational database. The selected order is displayed to the user with previously entered data. For each non-null object within the order, the user may either select the previously entered data into the new order or overwrite this data with new data. Additionally, to the extent that a particular object within an order is null, the user may enter appropriate data within that object. Next, the rules established for this order operate as described above to ensure that data is accurately and completely entered. Thereafter, the software processes this information and generates a new order based on this information.

In yet another embodiment, to create a new order from both an existing template(s) and order(s), the user is prompted to create a new, blank order. Next, the user is provided with the option of selecting templates and/or orders which were created and saved from a previous photomask order. Depending upon the type of photomask to be manufactured from the new order, the user selects and loads the relevant template(s) stored in a relational database. The selected template is displayed to the user with previously entered data. For each non-null object within the template, the user may either select the previously entered data into the new order or over-write this data with new data. Additionally, to the extent that a particular object within a template is null, the user may enter appropriate data within that object. Next, the rules established for this order operate as described above to ensure that data is accurately and completely entered. Additionally, previously saved orders may also be merged into the same order. In this regard, the user can select and load previously placed order(s) stored in a relational database. The selected order is displayed to the user with previously entered data. For each non-null object within the order (e.g., the object contains data), the user may either select the previously entered data into the new order or over-write this data with new data. Additionally, to the extent that a particular object within a order is already empty, the user may enter appropriate data within that object. Next, the rules established for this order operate as described above to ensure that data is accurately and completely entered. Once all of the appropriate templates and orders have been merged into the new order, the software processes this information and generates a new order based on this information.

Also, existing components and/or subcomponents of a previous order or template may be imported into a new photomask order or template. For example, existing components and/or subcomponents related to billing and/or shipping address may be applied to an order or a template. In addition, one or more unique specification grades defined within the application may be merged into a new order or template.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims and not by the foregoing specification.

What is claimed is:

1. A method for generating a photomask order, comprising the steps of:
    receiving at a first computer system at least one script command entered by a user at a second computer system as a plaintext instruction set, the plaintext instruction set being written in a high-level programming language that is capable of being interpreted to create or modify at least one template or order stored on a computer readable media;
    executing at the first computer system said at least one script command to create or modify the at least one template or order; and
    generating at the first computer system said photomask order based on said at least one order or template.

2. The method of claim 1, further comprising the step of executing said at least one script command to create one or more new orders.

3. The method of claim 1, further comprising the step of executing said at least one script command to create one or more orders from said at least one template or order.

4. The method of claim 1, further comprising the step of executing said at least one script command to add new components or subcomponents to said at least one template or order.

5. The method of claim 1, further comprising the step of executing said at least one script command to create SEMI P-10 files from said at least one template or order.

6. The method of claim 1, further comprising the step of executing said at least one script command to make batch edits to a plurality of orders and templates simultaneously.

7. The method of claim 1, wherein said at least one script command comprises a call to one or more functions stored in a system library.

8. The method of claim 1, further comprising the steps of:
    importing electronic information associated with said photomask order; and
    converting said electronic information into photomask order data to create said at least one template or order.

9. The method of claim 8, wherein said electronic information comprises a partial order in a SEMI P-10 file.

10. The method of claim 8, wherein said electronic information comprises a complete order in a SEMI P-10 file.

11. The method of claim 8, wherein said electronic information comprises a partial template or order in standard or proprietary format.

12. The method of claim 8, wherein said electronic information comprises a complete template or order in standard or proprietary format.

13. A system for generating a photomask order, comprising a computer readable storage device containing computer-readable instructions executable on a computer processor to perform a method comprising the steps of:
    receiving at a first computer system at least one script command entered by a user at a second computer system as a plaintext instruction set, the plaintext instruction set being written in a high-level programming language that is capable of being interpreted to create or modify at least one template or order;
    executing at the first computer system said at least one script command to create or modify the at least one template or order; and
    generating at the first computer system said photomask order based on said at least one order or template.

14. The system of claim 13, wherein said computer readable storage device further capable of performing the step of executing said at least one script command to create one or more new orders.

15. The system of claim 13, wherein said computer readable storage device further capable of performing the step of executing said at least one script command to create one or more orders from said at least one template or order.

16. The system of claim 13, wherein said computer readable storage device further capable of performing the step of executing said at least one script command to add new components or subcomponents to said at least one template or order.

17. The system of claim 13, wherein said computer readable storage device further capable of performing the step of executing said at least one script command to create SEMI P-10 files from said at least one template or order.

18. The system of claim 13, wherein said computer readable storage device further capable of performing the step of executing said at least one script command to make batch edits to a plurality of orders and templates simultaneously.

19. The system of claim 13, wherein said at least one script command comprises a call to one or more functions stored in a system library.

20. The system of claim 13, wherein said computer readable storage device further capable of performing the steps of:
importing electronic information associated with said photomask order; and
converting said electronic information into photomask order data to create said at least one template or order.

21. The system of claim 20, wherein said electronic information comprises a partial order in a SEMI P-10 file.

22. The system of claim 20, wherein said electronic information comprises a complete order in a SEMI P-10 file.

23. The system of claim 20, wherein said electronic information comprises a partial template or order in standard or proprietary format.

24. The system of claim 20, wherein said electronic information comprises a complete template or order in standard or proprietary format.

* * * * *